Patented Sept. 1, 1925.

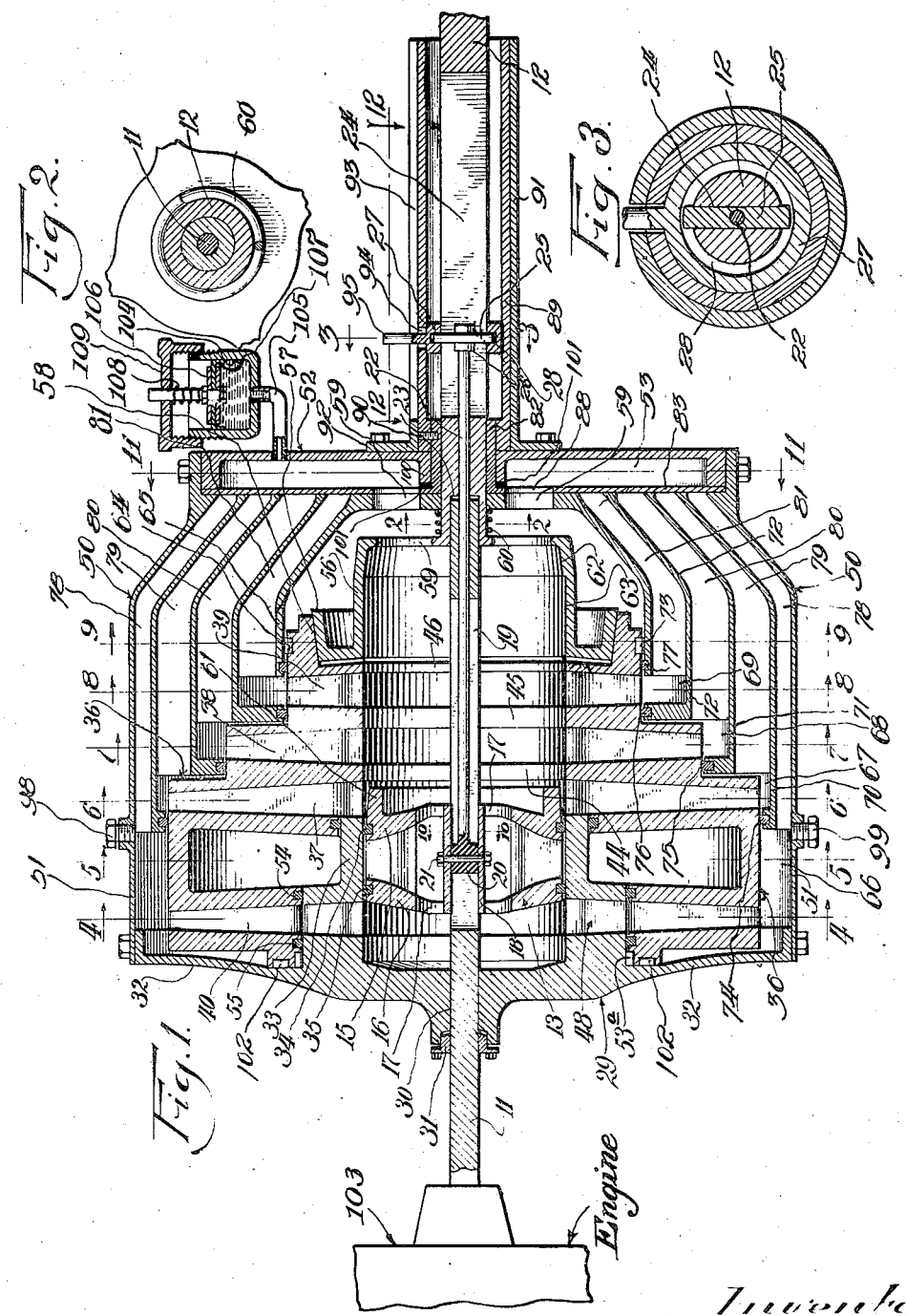

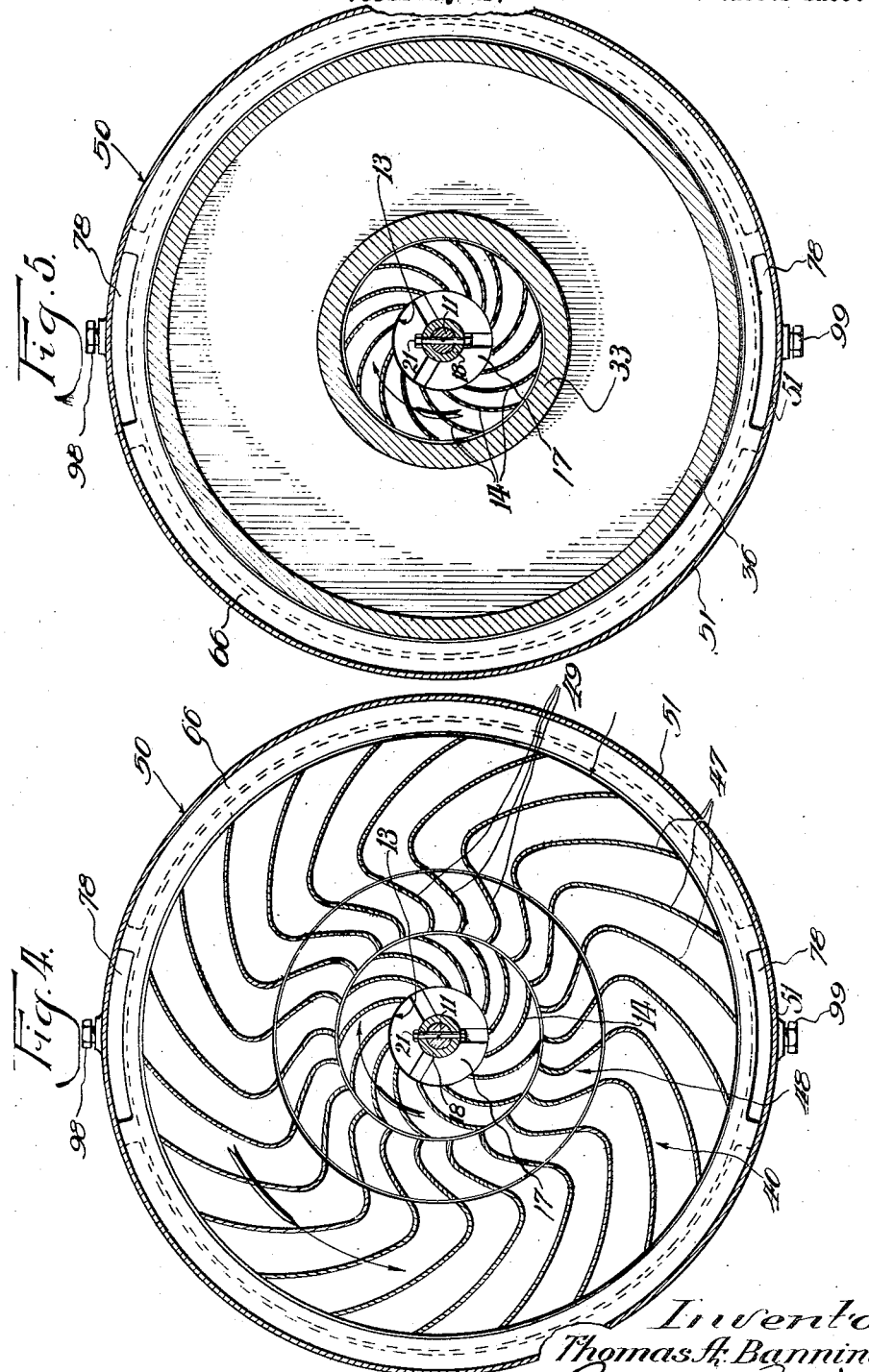

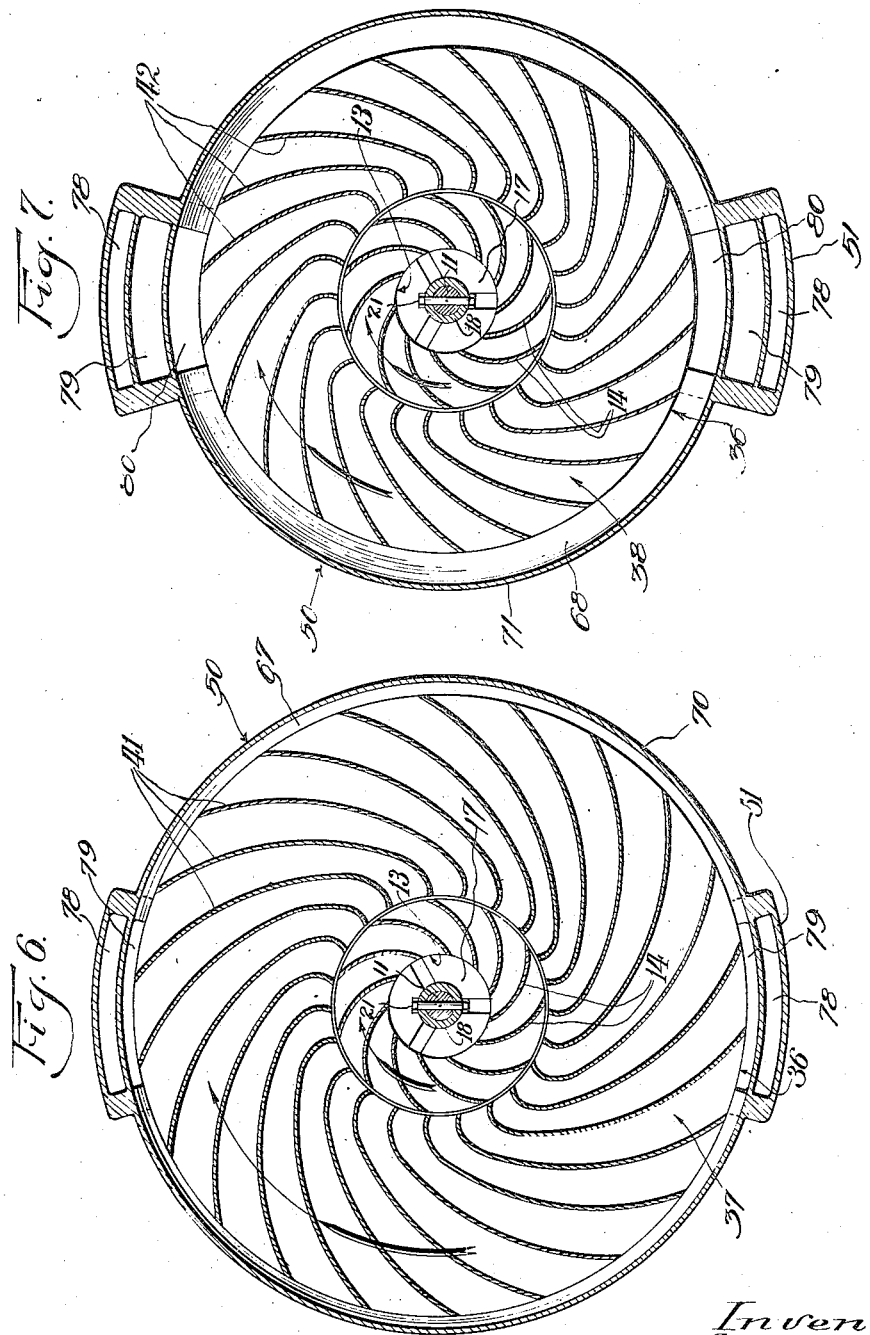

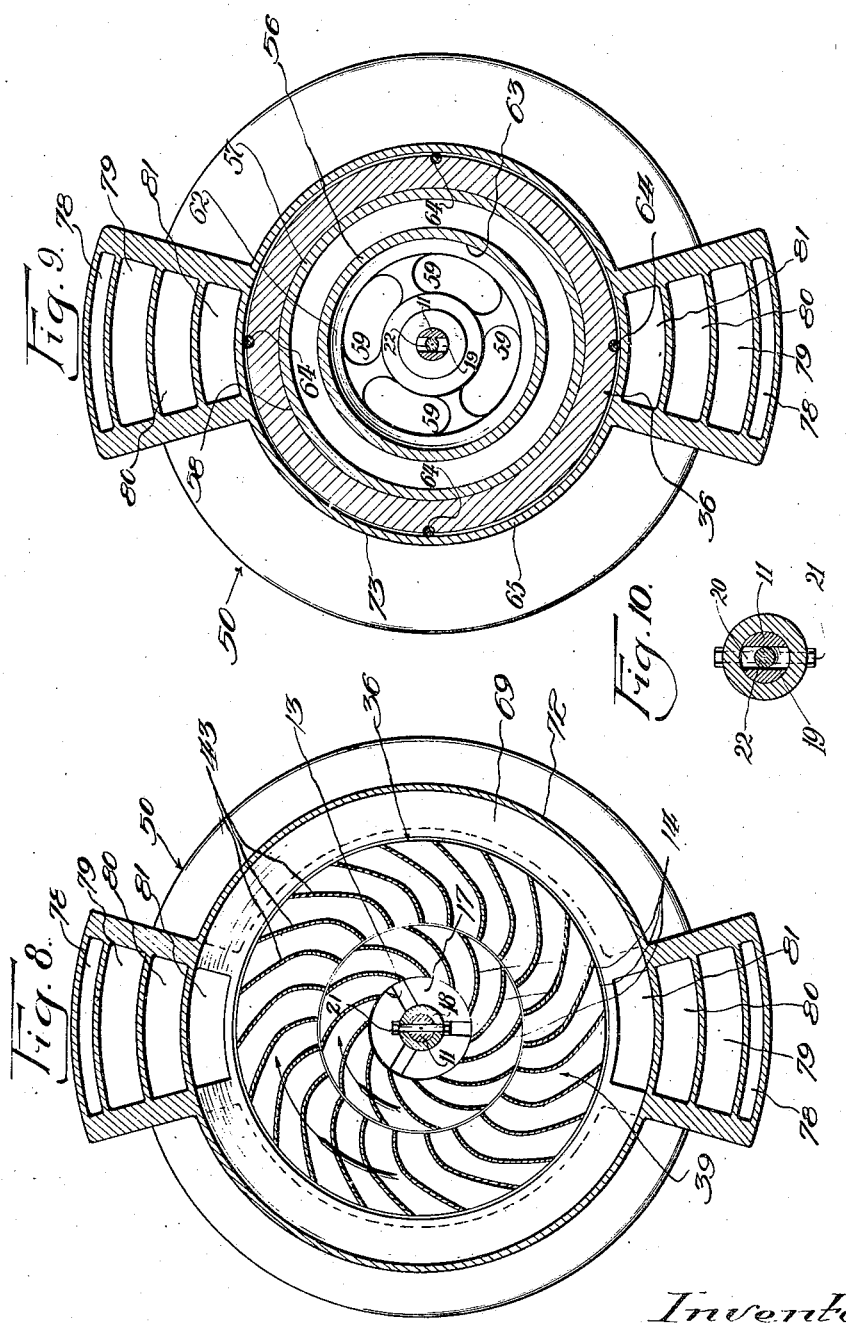

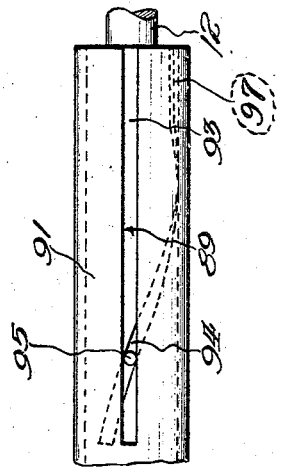
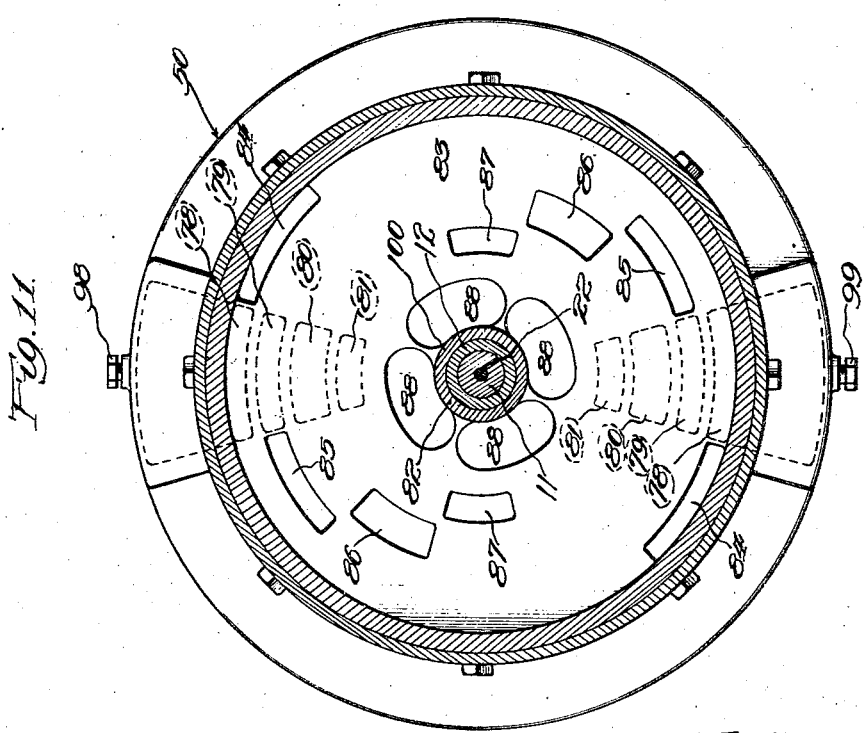

1,552,194

UNITED STATES PATENT OFFICE.

THOMAS A. BANNING, JR., OF WILMETTE, ILLINOIS.

FLUID CHANGE-SPEED DEVICE.

Application filed May 11, 1922. Serial No. 560,064.

*To all whom it may concern:*

Be it known that I, THOMAS A. BANNING, Jr., a citizen of the United States, residing at Wilmette, in the county of Cook and State of Illinois, have invented certain new and useful Improvements in Fluid Change-Speed Devices, of which the following is a specification.

This invention has to do with certain improvements in change speed devices in which the transfer of energy from the driving to the driven shaft is accomplished by the use of a fluid such as water, oil, mercury, or other suitable liquid.

One of the objects of the invention is to provide a change speed device in which the change of speed between the two shafts is effected in such a manner as to conserve all of the energy with the exception of that lost in friction and similar unavoidable losses, and in such a manner that the product of speed times torque on the two shafts of the machine will be equal, with the exception of those losses which are unavoidable as previously mentioned. With this arrangement, the use of the device for reduction of speed will make possible a corresponding increase of torque, or on the contrary, an increase of speed will be accompanied by a corresponding decrease of torque.

Another object of the invention is to provide an arrangement in which the ratio between the speeds of the two shafts and similarly the ratio between the torques of the two shafts may be very easily changed from time to time, while nevertheless always maintaining such a condition that the power output will be equal to the power input disregarding frictional and other similar losses. In this connection, another object is to provide an arrangement such that the transition from one ratio to another either to increase or decrease speed may be very simply and easily effected and in such a manner that the transfer of power from one shaft to the other may be continuous and uninterrupted and without the creation of sudden jerks with the attendant objectionable strains and sensations.

In this connection, still another object is to provide an arrangement such that when the driven shaft is to stand idle the driving shaft may continue to rotate at either full or partial speed substantially without loss of energy, and such that if it is desired to bring the driven shaft up to speed, this may be done by a series of operations in which the power initially applied to the driven shaft may be applied thereto without jerk, such that a very heavy torque may be created during the early stages of the operation accompanied by the low speed of operation of the driven shaft such that thereafter the speed of the driven shaft may be readily increased by smooth transition and without jerks and with corresponding reduction of torque up to substantially the full running speed of the driving shaft. In this connection, another object is to provide an arrangement such that after the driven shaft has been brought up to a speed approximating the full speed of the driving shaft a direct connection may be established between the two shafts so that thereafter the operation will be conducted by a direct drive straight through the transmission.

Another object of the invention is to provide an arrangement such that the fluid transmission principle may also be used for reversal of operation, the driven shaft at such time being driven in a reversed direction as compared to the driving shaft. A further object in this connection is to effect such reverse of drive by an arrangement in which the speed of the driven shaft will be reduced as compared to that of the driving shaft with corresponding increase of torque.

In connection with the reversing feature, another object is to provide an arrangement such that the reversing operation may be brought into effect in a gradual manner without jerk and corresponding unpleasant sensations. A further object in this connection is to provide an arrangement such that the reversing position of the parts will be located at one side of their neutral position, and the forward positions of the parts at the other side of their neutral position, so that in shifting between the forward running and reversing positions the neutral position of the parts is encountered.

More particularly, an object of the invention is to provide a transmission device peculiarly suitable for use in the driving of automobiles and other motor driven vehicles, and for controlling the delivery of power from the prime mover to the driving wheels. In this connection, an object is to provide an arrangement which is very compact in form, which can be very cheaply and efficiently manufactured from a relatively small number of parts, which will have a high efficiency in operation, which will be sturdy and stand up under heavy service, and which may be very easily controlled with the application of a very small control force.

Other objects and uses of the invention will appear from a detailed description of the same, which consists in the features of construction and combinations of parts hereinafter described and claimed.

In the drawings:

Figure 1 shows a vertical longitudinal section through a construction embodying the features of the present invention;

Fig. 2 shows a fragmentary section on enlarged scale on the line 2—2 of Fig. 1, looking in the direction of the arrows;

Fig. 3 shows a fragmentary section on enlarged scale taken on the line 3—3 of Fig. 1 looking in the direction of the arrows;

Figs. 4, 5, 6, 7, 8, and 9 show sections on the lines 4—4, 5—5, 6—6, 7—7, 8—8, and 9—9 respectively of Fig. 1 looking in the direction of the arrows Figs. 4, 6, 7, and 8 being modified to also show the pump impeller;

Fig. 10 shows a fragmentary section on enlarged scale on the line 10—10 of Fig. 1, looking in the direction of the arrows; and Figs. 11 and 12 are views taken on the lines 11—11 and 12—12, respectively, of Fig. 1 looking in the directions of the arrows.

The transmission device illustrated includes the driving and driven shafts 11 and 12 respectively between which power is to be transmitted. Ordinarily a device of this kind will be used for the reduction of speed during the transmission, and therefore, for purposes of convenience, I will designate the high speed shaft 11 as the driving shaft, and the low speed shaft 12 as the driven shaft. Furthermore, inasmuch as the construction herein illustrated is especially intended for use in connection with motor cars and the like, the shaft 11 will ordinarily be the motor shaft or driven by the motor, and the shaft 12 will be the propeller shaft, or the shaft leading to the driving wheels. Therefore, for purposes of convenience in description and to simplify the specification, I will hereinafter refer to the shafts 11 and 12 as the motor and propeller shafts respectively, or as the driving and driven shafts respectively, but in so doing, I wish it distinctly understood that I do not intend to limit the usefulness and application of the invention or the form of the construction, shown in the drawings.

The driving shaft 11 carries an impeller 13 which is slidably mounted on the driving shaft but is so keyed thereto that it is compelled to rotate with the driving shaft in all of the driving positions. As a convenient construction, this impeller is shown as including a series of vanes 14 carried between the side plates 15 and 16 of the impeller, said vanes being adapted to draw liquid from the central opening or openings 17 and deliver the same at the periphery of the impeller. The impeller rotates in the direction of the arrows shown in each of the Figs. 4, 5, 6, 7 and 8. Examination of Fig. 1 also shows that the vanes are broader axially at their inner edges than at their outer edges, so that the fluid clearances between the successive vanes remain practically uniform as the fluid travels outwardly towards the periphery of the impeller.

The hydrostatic pressure which will be generated depends upon the peripheral speed of the impeller and upon the specific gravity of the liquid used. This hydrostatic pressure increases as the square of the peripheral velocity of the impeller and directly as the specific gravity of the liquid.

Since the impeller is slidably mounted upon the sliding shaft 11 but is to be driven at different positions thereof, I have provided the construction illustrated in the drawings. In this case the hub 18 of the impeller is slidably mounted on the shaft 11, said shaft being provided with a longitudinally extending slot 19 within which there is a key 20 as shown in Fig. 10, said key being drivingly connected to the hub 18 as by means of a cross pin 21. Consequently, the impeller is compelled to rotate with the shaft, but may be slid back and forth. A rod 22 connected to the key 20 extends lengthwise of the shaft 11 to a point where it may be conveniently shifted back and forth so as to change the driving position of the impeller on the shaft.

The driven shaft 12 is located in alignment with respect to the driving shaft 11. For this purpose, the end of the driven shaft 12 is socketed as shown at 23 so as to provide a bearing for this end of the driving shaft. The driven shaft is slotted as shown at 24 and the end portion of the rod 22 reaches into this slot. A block 25 is located in the slot 24, said block being connected to the end of the rod 22 by a journal connection 26, so that the rod 22 may rotate at a different speed from the speed of the block 25 depending on the difference between the speeds of the two shafts 11 and 12. A collar 27 is located on the driven shaft 12, said collar having an internal groove 28 which receives the end portions of the block 25 and permits said block to rotate with the driven shaft 12 while the collar 27 may or may not rotate. By shifting the collar 27 back and forth the position of the impeller will be correspondingly shifted.

The casing of the machine includes a stationary head 29 within which the driving shaft 11 is journaled as shown at 30. A stuffing box 31 is provided at this point to prevent the loss of liquid from the transmission. This stationary head 29 includes a radial flange 32. The head 29 is also provided with an axial flange 33 of which the axial length is sufficient to completely overlie the discharge periphery of the impeller 13 when said impeller stands in the neutral position of Fig. 1. The flange 33 is also of a diameter to enclose the peripheral portion of the impeller when the latter is in the neutral position, so as to close the passages between the impeller vanes and prevent any outflow of liquid. The impeller is shown as being provided with sealing rings 34 and 35 adapted to engage with the inner surface of the flange 33 in order to insure a liquid tight seal.

There is provided a turbine element 36. This turbine element is rotatably mounted within the casing and is adapted to establish driving connection with the driven shaft 12. The turbine element is provided with one or more groups of driving vanes through which the liquid from the impeller is adapted to travel and by which the pressure generated by the impeller is absorbed with consequent transmission of work to the driven shaft. In the particular construction illustrated, I have shown three sets of these vanes for forward driving speeds, the same being generally designated by the numerals 37, 38 and 39 respectively. In the construction illustrated, I have also shown another set of vanes 40 in the follower 36 for back running or reversing.

The forward drive vanes of the three positions 37, 38 and 39 are shown respectively in Figs. 6, 7, and 8, and in each of these figures the impeller is also shown in the position which it would normally occupy when driving at such position.

Examination of Figs. 6, 7 and 8 shows that the vanes 41, 42 and 43 of the turbine sections 37, 38 and 39 respectively, are so formed as to tend to drive the turbine in the direction of the arrows in said figures, being the same direction of rotation as that of the impeller.

The turbine section 36 has a central bore through which the impeller section may be moved so as to bring the impeller periphery into direct registry with the inner ends of the passages between the vanes of the turbine. When this is done the liquid from the impeller directly enters the inner ends of the turbine passages. The liquid then flows through the turbine section and is discharged from the periphery thereof. This liquid in flowing between the vanes of the turbine section exerts a driving force thereon, so that the turbine commences to operate as a motor.

The inner axial dimensions of the groups of turbine vanes 37, 38 and 39 is substantially the same in each case as the peripheral dimension of the impeller vanes. Furthermore, the curves on which the axial dimensions of the turbine vanes are restricted as their diameter increases are theoretically continuations of the same curves for the impeller vanes.

Between the sets of turbine vanes there are provided the annular seats 44 and 45 with which the peripheral portions of the impeller walls 15 and 16 may engage or which may be contacted by the sealing rings 34 and 35. The distance from the axial flange 33 to the ring 44, and from the ring 44 to the ring 45, and from the ring 45 to the end ring 46 is in each case substantially the same as the distance between the sealing rings 34 and 35. Consequently, by shifting the impeller to the low speed position where its ring 34 engages the ring 44, the ring 35 will still remain sealed against the flange 33 and the liquid will be delivered in its entirety through the turbine section 37. In like manner when the ring 34 is brought into register with the ring 45, and the ring 35 into register with the ring 44, the entire volume of liquid will be discharged through the turbine section 38; and when the ring 34 is brought into register with the ring 46 and the ring 35 into register with the ring 45, the entire volume of the liquid will be discharged through the section 39. In this way the impeller can be made to deliver its liquid into either set of turbine passages and the speed of the turbine will thus increase step by step.

It is to be observed that the axial dimension of each of the rings 44 and 45 is somewhat less than the distance between the sealing rings 34 and 35, so that in shifting from one position to the next, there will be an interval of time when the impeller is acting upon two follower sections and in this way the delivery of liquid to one section will commence before delivery to the preceding section ceases.

Considering now the reversing turbine section 40, examination of Fig. 4 shows that the vanes 47 of this section face in the opposite direction from those of the sections 37, 38 and 39, and also the opposite direction to the vanes of the impeller. Intermediate between the impeller position and the inner ends of the face of the reversing section, there is located a guide vane ring 48 having a series of vanes 49. This section and vanes are stationary. These vanes are so shaped and placed that the liquid delivered from the periphery of the impeller is taken up by them and compelled to travel in a reversed direction, or is at any rate largely prevented from traveling in the same angular direction as that of the impeller. The vanes 47 of this reversing turbine section are faced backwardly so that as they receive their liquid from the guide vane ring 48 they tend to travel backwardly and thus reverse the turbine.

The guide vane ring, 48 is conveniently formed as a portion of the head section 29, and is located at the inner end of the axial flange 33 as shown in Fig. 1. Thus it is given a very rigid support, is conveniently and naturally located, and serves to support the flange 33.

The body portion of the mechanism is enclosed by a casing member 50 which has peripheral flange 51 which seats against the peripheral portion of the flange 32 of the head member 29. A head section 52 closes the other end of the casing member 50 and establishes a chamber 53 adjacent to the end thereof.

The turbine section 36 has one end journaled on the head section 29 and its other end in driving connection with the shaft 12. The aforesaid journaling may be effected by means of roller bearings 53$^a$ interposed between the turbine section and the guide vane ring, or any other suitable bearings may be provided. Furthermore, sealing rings 54 and 55 may be provided on the turbine section at opposite sides of the reversing section, so as to prevent leakage of liquid at this point.

The driving connection from the turbine section 36 to the shaft 12 may be effected in any convenient manner, but the arrangement illustrated is found to be desirable for a number of reasons. This arrangement includes a drum 56 located within the casing and having a cone flange 57 adapted to engage a cone seat 58 in the end portion of the turbine section and thus establish a driving connection from the turbine to the drum. This drum in turn is secured to the driven shaft 12 or constitutes a portion thereof, there being a series of passages 59 through which the operating liquid may circulate as will be presently explained.

A spring 60 is interposed between the drum and the end portion of the casing and tends to retain the drum in engagement with the turbine so as to establish the driving connection.

The impeller is provided with a conical flange 61 which is adapted to drivingly engage a conical seat 62 within the drum 56 when the impeller is moved over to the direct drive position. By thus drawing the impeller over with sufficient force the flange 61 will wedge into the conical seat 62 to establish the driving connection, and the drum 56 will be drawn over to the right against the force of the spring 60 so as to thereupon disengage the drum from the turbine. When this takes place, the turbine will be entirely disengaged and the driving shaft 11 will drive the driven shaft 12 by a direct drive.

It is noted that the drum 56 is provided with a barrel surface 63 of proper diameter and axial length to seal the impeller when in the direct drive position, so that although the impeller is rotating at such time it will not be driving any liquid with consequent loss of energy.

The direct drive end portion of the turbine is normally supported by the drum flange 57 and needs no other support. When, however, the direct drive is established, it is desirable to support this end of the turbine and for this reason, I have illustrated the roller bearings 64 on the turbine bearing against the bearing surface 65 of the casing member 50.

Within the casing 50 there are established a series of more or less annular passages 66, 67, 68 and 69. These passages are formed by the partitions 70, 71 and 72 and 73. The end of the partition 70 is provided with a sealing ring 74 bearing against the outer periphery of the follower 36 at a point between the low speed section 37 and the reversing section 40; the end of the partition 71 carries a sealing ring 75 which bears against the turbine 36 at a point between the low speed and intermediate sections 37 and 38 respectively; the partition 72 carries a sealing ring 76 which bears against the turbine 36 at a point between the intermediate and high speed sections 38 and 39; and the partition 73 carries a sealing ring 77 which bears against the turbine at a point beyond the high speed section 39. Consequently, the passages 66, 67, 68 and 69 are individualized with respect to the reversing section, the low speed section, the intermediate section and the high speed section of the turbine respectively.

I have provided valve means for controlling the flow of liquid through these various passages in proper synchronism with respect to the movements of the impeller into different positions, so that when the impeller stands in either the neutral position shown in Fig. 1 or in the direct drive position all of the passages 66, 67, 68 and 69 are closed against any flow of liquid through them, and so that as the impeller is moved into direct communication with either the reversing section or one of the forward drive sections of the turbine the valve will be correspondingly adjusted so as to permit the flow of liquid only through those sections of the turbine with which the impeller is momentarily connected. This valve means I will now describe in detail.

The passages 66, 67, 68 and 69 all communicate with a series of passages 78, 79, 80 and 81 respectively, which in turn lead to points adjacent to the chamber 53 which is established by the head 52. A sleeve 82 is journaled on the driven shaft 12, extending inwardly past the central portion of the head 52, and its inner end is provided with a disk valve 83 which overlies the inner end of all of the passages 78, 79, 80 and 81. Reference to Fig. 11 which is a face view looking at the disk valve 83, discloses four sets of concentrically located valve ports 84, 85, 86 and 87 properly positioned so that they may be brought respectively into register with the passages 78, 79, 80 and 81. In order to accomplish this result, the ports 84, 85, 86 and 87 are placed at different angular positions with respect to the positions of the passages 78, 79, 80 and 81. In the construction illustrated there are two sets of the passages 78, 79, 80 and 81 placed diametrically opposite to each other, and intermediate between these sets there are blind spaces so that when the impeller stands in the neutral position or in the direct drive position all of the ports will be closed and thus the passages will all be sealed. This fact is clearly evident from examination of Fig. 11.

The central portion of the disk valve 83 is provided with a series of openings 88 which allow communication from the chamber 53 to the ports 59 at all positions of the disk valve, so as to allow a free return of the liquid axially to the impeller.

The sleeve 82 for the disk valve reaches to a point outside of the casing. It is connected to another sleeve 89 by a pin 90 so that rotation of the sleeve 89 correspondingly rotates the disk valve. Another sleeve 91 is located just outside of the sleeve 89, the sleeve 91 being rigidly secured to the head 52 by a flange 92.

The sleeve 91 is provided with a straight axially extending slot 93 which acts as a guide slot, and the sleeve 89 is provided with a spirally shaped axially extending slot 94. The collar 27 is provided with a control pin 95 which reaches up through both of the slots 94 and 93 to a point outside of the sleeve 91, so that said pin 95 can be readily shifted back and forth parallel to the driven shaft. As said pin is so shifted, it is compelled to retain the same angular position by reason of the form of the slot 93, but the sleeve 89 is simultaneously compelled to rotate in the one direction or the other by reason of the form of the spiral slot 94, as indicated in Fig. 12. It will be noted that the slot 94 is provided with a dwell 97 at its outer end. This dwell is so positioned and of such size and shape that it gives the disk valve 83 the proper stoppage in movement while the impeller is traveling at or adjacent to the direct drive position where the impeller is located within the drum 56.

It will be noted that each of the forward running sections 37, 38 and 39, also the reversing section 40, is isolated from communication with the other sections or from communication with the inlet side of the impeller except under control of the valve 83. Furthermore, even when the impeller is in communication with any given section, said section is still isolated from all of the other sections although in communication through the valve 83 with the inlet side of the impeller. This prevents the existence of any cross currents between the various sections of the turbine, which cross currents would otherwise exist owing to differences in peripheral velocity of the different sections of the turbine when the turbine is in rotation. Consequently, the operation of the turbine is also individual to the operation as dictated by the particular section with which the impeller is momentarily in connection.

Ordinarily, during the operation of this device, it will be completely or substantially completely filled with liquid in order to avoid as much as possible the reduction of specific gravity of the oil by admixture of air bubbles therewith.

It is also noted that as the impeller is progressively shifted towards the direct drive position, the relative speed of rotation existing between the driving and driven shafts is reduced until finally when the direct drive position is reached both shafts are rotating at the same speeds. The relative speed of rotation existing at the bearing 26 between the rod 22 and the cross block 25 is equal to the difference between the speeds of rotation of the two shafts.

In the direct drive position a pull is exerted on the rod 22 to retain the flange 61 of the impeller in engagement with the cone face 62 of the follower drum. This throws a corresponding load on the bearing 26, but inasmuch as no rotation is taking place in this bearing during the direct drive position, it follows that there will be no wear occasioned by the pull transmitted through this bearing.

In this connection it is observed that at all intermediate positions of the impeller there is little, if any, force existing tending to shift the position of the impeller on the driving shaft, so that the impeller will retain a position into which it is brought without the exertion of any continuous pull on the rod 22, other than that which may be necessary to resist the flow of the liquid towards and into the inlet passages of the impeller.

In order to permit the casing to be filled or drained with the oil or other liquid, I have indicated the plugs 98 and 99 in its upper and lower portions respectively.

The head 52 is shown as being provided with an inturned flange 100 bearing upon the sleeve 82 of the disk valve, this flange 100 establishing a bearing at this end of the machine. If desired, a packing ring of felt or other suitable material 101 may be placed between the flange 100 and the face of the disk valve, so as to seal against loss of liquid at this point, although ordinarily such special precaution will not be needed.

I wish also to point out the fact that in each of the forward running positions the liquid has a certain amount of circumferential velocity, which under ordinary circumstances would probably represent a proportionate loss of energy in the machine considered as a pump. Since, however, the turbine is traveling in the same direction as the impeller, any such circumferential velocity will be directly transmitted to the turbine with elimination of loss of energy and consequent improvement of efficiency. It, therefore, follows that the combination of the impeller delivering its liquid directly to the turbine which travels in the same direction, makes it possible to secure a conversion of power from one speed to another at very high efficiency and in a very simple manner.

A thrust roller bearing 102 is shown between the head member 29 and the turbine, said bearing serving to take up the thrust exerted on the turbine by action of the spring 60 when the flange 57 is wedged into the cone 58 of the turbine.

I wish to point out the fact that such oils for example as what is known as straw oil, which is one of the oils recovered from paraffine petroleum after the paraffine wax has been removed are desirable for use with this transmission. This oil has a boiling point approximating 350° C., it flows readily at temperatures as low as 30° C. below zero, can be obtained in quantities, at a reasonable price, and will serve also as an effective lubricant for the running parts of the transmission. Other oils approximating the characteristics of straw oil are what is known as spindle oil and mineral seal oil.

As previously stated the construction herein illustrated is especially intended for use in reducing speed from the shaft 11 to the shaft 12. Nevertheless, if desired, power could be applied to the shaft 12 at one speed and removed from the shaft 11 at a higher speed. In other words, the mechanism could be used for increasing speed instead of reducing it. This is because the application of power to the shaft 12 with consequent driving of the turbine 36 will result in the generation of a hydrostatic pressure at the periphery of each of the turbine sections, the pressures so generated being communicated through the various passages to the valve 83. When the impeller is in communication with any given turbine section the corresponding valve ports are opened allowing the liquid to be communicated to the inlet side of the impeller, which liquid will then flow outward through the vanes of the impeller, driving it as a turbine.

By reason of the foregoing fact, it also follows that the apparatus will serve for the regeneration of power in case the vehicle should be traveling down grade. The mechanism is, for this additional reason, very well adapted for use as the transmission device of a power driven vehicle.

The transmission device herein disclosed may be used for changing speed from one element to another and for any desired purpose. I have, however, pointed out the fact that it is particularly well adapted for use in connection with automobiles, trucks, and other motor driven vehicles. In this connection, it is especially well adapted for use in connection with gas engine driven vehicles. This is because it is unnecessary to make use of a clutch device intermediate between the engine shaft and the pumping element of the transmission, since said pumping element may operate at all times at the full speed of the engine shaft, or at a definite speed ratio as compared with the engine shaft. When accelerating a vehicle equipped with this transmission the driver may slide the impeller from the neutral position to the low speed or any other running position without danger of stalling the engine no matter how rapidly the transition from the neutral position, or from position to position may be made. This is because the pumping element generates a fluid pressure dependent on the square of the angular speed of the impeller, and in case of overloading by a too rapid acceleration, the only result would be to slow down the engine to a speed such that the reduction in fluid pressure delivered by the impeller would sufficiently reduce the demand for power to a point where the engine could take care of it. The engine under such conditions could never be stalled because a reduced speed would be reached such that the engine could at least continue to idle, the impeller at such time delivering only a small fluid pressure.

For the foregoing reasons among others, this transmission may be used for very rapid acceleration, since the transmission may be rapidly moved to the high speed position, even before a time when the vehicle will have reached a proper speed for the direct drive, and by speeding up the engine the vehicle may be rapidly accelerated up to a point where the direct drive may be conveniently established. Thereupon, the transmission may be thrown into the direct drive position without stalling or overloading the engine.

There may be a slight amount of leakage of oil through the shaft bearings, which in the course of time would assume noticeable proportions. In order to make provision for the automatic and continuous replenishment of any small amount of oil which will thus be lost, I have provided a chamber 104 in communication with the interior of the casing by means of a pipe 105. This chamber is provided with a plunger 106 which preferably has a leather cup 107. The plunger may travel along in the chamber so as to establish a continuous feed of oil in such small quantities as needed to replenish the forgoing relatively small amount of loss.

It is well understood that when a centrifugal impeller is operated at excessive speed, it may not properly draw the liquid into its intake side but may tend to lose its "prime". When this takes place it fails to perform its pumping action to the fullest efficiency and capacity. Any such tendency which might exist in the present case when operating at very high speed, may be overcome by placing the oil within the chamber under a proper fluid pressure. Such tendency may also be eliminated by keeping the chamber at all times substantially filled with oil. I have already explained how the movable plunger 106 within the chamber 104 will supply oil in sufficient amounts to constantly compensate for any slight leakage. The oil within the transmission itself may be placed under any desired amount of pressure by reason of the following construction: A spring 108 operates against the plunger 106 and forces it downwardly so as to increase the hydrostatic pressure communicated through the pipe 105 to the transmission. This spring also bears against the cap 109 which is threaded on the upper end of the chamber 104 and by adjusting the position of this cap the pressure exerted by the spring can be adjusted, so that any desired pressure will exist within the transmission case.

It thus appears that I have provided a method of operation in which the entire body of circulating liquid may be placed and kept under the desired hydrostatic pressure, and I provide means for adjusting this pressure to any amount which may be desired.

I have already mentioned that the pumping element may operate at the full speed of the engine shaft or at a higher or lower speed than that of the engine shaft in case a gear or similar connection should be established between the engine shaft of the engine 103 and the pumping element. The capacity of the transmission to transfer power from the intake to the delivery side will depend upon among other things on the speed at which the impeller may be operated. It may therefore sometimes be found desirable to provide a fixed increase of speed from the engine shaft to the impeller by the use of a gear or the like. By placing the liquid under an increased hydrostatic pressure this increase of speed may be used and at the same time the tendency to drop the prime be eliminated.

In those cases in which a gear or other similar device is interposed between the engine and the transmission for either increasing or reducing the speed of the shaft 11 in fixed ratio, it follows that the speed and direction of the shaft 11 of the transmission may or may not be the same as these factors in the engine itself. Nevertheless, in such case the speed of the shaft 11 will maintain a constant ratio to the engine speed and the direction of rotation of the shaft 11 will be either the same or the opposite to that of the engine. Therefore, in the claims where I use such expressions as "adapted for normal operation in the same direction of rotation as that of the engine" or "directly driven by the engine shaft" or similar expressions, it will be understood that they are to be interpreted as also including, if desired, the use of gears or the like between the engine shaft and the transmission, and are not to be literally interpreted as meaning in every instance a positive direct connection between the engine shaft and the transmission itself.

While I have herein shown and described only a single embodiment of the features of my present invention, still I do not intend to limit myself to the same except as I may do so in the claims.

I claim:

1. A fluid change speed device comprising in combination aligned driving and driven shafts, an impeller slidably and drivingly mounted on the driving shaft, and adapted to be shifted progressively from a reversing position, through a neutral position and through a plurality of forward running positions of progressively reducing ratio to a direct drive position, said impeller having a series of outwardly extending vanes, a drum secured to the driven shaft and overlying the end portion of the driving shaft and having a barrel of size suitable to receive the impeller and completely overlie and seal the discharge ends of the passages between the impeller vanes when the impeller is in the direct drive position, suitable co-operative clutch devices on the impeller and the drum adapted to establish a direct drive connection between the driving shaft and the driven shaft when the impeller is within the drum, a turbine member concentrically located with respect to the driving shaft and the impeller, said turbine member having a plurality of sets of outwardly extending vanes having the peripheral diameters of said sets of turbine vanes progressively smaller from the neutral towards the direct drive position, a stationary guide vane ring overlying the reversing position of the impeller and having a series of outwardly extending vanes adapted to receive liquid discharged by the impeller and direct the same into a reversed rotary direction of flow and also having a neutral position adjacent to the position of said reversing position, a series of outwardly extending vanes in the turbine overlying the position of said guide vane ring and adapted to cause reverse movement of the turbine as compared to the first mentioned sets of turbine vanes, a driving connection between the turbine and the driven shaft, a suitable casing enclosing all of said parts in liquid tight fashion, there being individual annular passages encircling the outer peripheral portions of the several groups of turbine vanes, valve mechanism for placing said annular passages individually in communication with the inlet side of the impeller, said valve mechanism having a neutral position corresponding to the neutral position of the impeller within the guide vane ring aforesaid, means under the control of the operator for shifting the impeller longitudinally on the driving shaft into the different positions, and means for simultaneously shifting the position of the valve mechanism to thereby always maintain the valve in proper relation to establish communication between the outer discharge ends of these turbine sections into which the impeller is momentarily delivering liquid and the inlet side of the impeller, and to always prevent discharge of liquid from the outer peripheral portions of the turbine sections into which the impeller is not momentarily delivering liquid, substantially as described.

2. A fluid change speed device comprising in combination aligned driving and driven shafts, an impeller slidably and drivingly mounted on the driving shaft, and adapted to be shifted progressively from a reversing position, through a neutral position and through a plurality of forward running positions of progressively reducing ratio to a direct drive position, said impeller having a series of outwardly extending vanes, a drum secured to the driven shaft and overlying the end portion of the driving shaft and having a barrel of size suitable to receive the impeller and completely overlie and seal the discharge ends of the passages between the impeller vanes when the impeller is in the direct drive position, suitable co-operative clutch devices on the impeller and the drum adapted to establish a direct drive connection between the driving shaft and the driven shaft when the impeller is within the drum, a turbine member concentrically located with respect to the driving shaft and the impeller, said turbine member having a plurality of sets of outwardly extending vanes having the peripheral diameters of said sets of turbine vanes progressively smaller from the neutral towards the direct drive position, a stationary guide vane ring overlying the reversing position of the impeller and having a series of outwardly extending vanes adapted to receive liquid discharged by the impeller and direct the same into a reversed rotary direction of flow and also having a neutral position adjacent to the position of said reversing position, a series of outwardly extending vanes in the turbine overlying the position of said guide vane ring and adapted to cause reverse movement of the turbine as compared to the first mentioned sets of turbine vanes, a driving connection between the turbine and the driven shaft, a suitable casing enclosing all of said parts in liquid tight fashion, passages individually in communication with the peripheral portions of the several groups of turbine vanes, valve mechanism for placing said passages individually in communication with the inlet side of the impeller, said valve mechanism having a neutral position corresponding to the neutral position of the impeller within the guide vane ring aforesaid, means under the control of the operator for shifting the impeller longitudinally on the driving shaft into the different positions, and means for simultaneously shifting the position of the valve mechanism to thereby always maintain the valve in proper relation to establish communication between the outer discharge ends of those turbine sections into which the impeller is momentarily delivering liquid and the inlet side of the impeller, and to always prevent discharge of liquid from the outer peripheral portions of the turbine sections into which the impeller is not momentarily delivering liquid, substantially as described.

3. A fluid change speed device comprising in combination aligned driving and driven shafts, an impeller slidably and drivingly mounted on the driving shaft, and adapted to be shifted progressively from a reversing position, through a neutral position and through a plurality of forward running positions or progressively reducing ratio to a direct drive position, said impeller having a series of outwardly extending vanes, a clutch element on the driven shaft, co-operative clutch devices on the impeller adapted to establish direct drive from the driving to the driven shaft when the impeller is in the direct drive position, means for sealing the impeller against travel of liquid therethrough when the impeller is in the direct drive position, a turbine member concentrically located with respect to the driving shaft and the impeller, said turbine member having a plurality of sets of outwardly extending vanes having the peripheral diameters of said sets of vanes progressively smaller from the neutral towards the direct drive position, a stationary guide vane ring overlying the reversing position of the impeller and having a series of outwardly extending vanes adapted to receive liquid discharged by the impeller and direct the same into a reversed rotary direction of flow, a series of outwardly extending vanes in the turbine overlying the position of said guide vane ring and adapted to cause reverse movement of the turbine as compared to the first mentioned sets of turbine vanes, a driving connection between the turbine and the driven shaft, a suitable casing enclosing all of said parts in liquid tight fashion, passages in individual communication with the discharge ends of the various turbine sections, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine sections to the inlet side of the impeller, substantially as described.

4. A fluid change speed device comprising in combination aligned driving and driven shafts, an impeller slidably and drivingly mounted on the driving shaft, and adapted to be shifted progressively from a reversing position through a neutral position and through a forward running position to a direct drive position, said impeller having a series of outwardly extending vanes, a clutch element on the driven shaft, co-operative clutch devices on the impeller adapted to establish direct drive from the driving shaft to the driven shaft when the impeller is in the direct drive position, means for sealing the impeller against travel of liquid therethrough when the impeller is in the direct drive position, a turbine member concentrically located with respect to the driving shaft and the impeller, said turbine member having a plurality of sets of outwardly extending vanes corresponding to the reversing and forward running positions, a stationary guide vane ring overlying the reversing position of the impeller and having a series of outwardly extending vanes adapted to receive liquid discharged by the impeller and direct the same into a reversed rotary direction of flow, the outwardly extending vanes of the turbine which correspond to the reversing position of the impeller being adapted to cause reverse movement of the turbine as compared to the direction of rotation of the impeller, a driving connection between the turbine and the driven shaft, a suitable casing enclosing all of said parts in liquid tight fashion, passages in individual communication with the discharge ends of the various sections of the turbine, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine sections to the inlet side of the impeller, substantially as described.

5. A fluid change speed device comprising in combination aligned driving and driven shafts, an impeller slidably and drivingly mounted on the driving shaft, and adapted to be shifted progressively from a neutral position through a plurality of forward running positions of progressively reducing ratio to a direct drive position, said impeller having a series of outwardly extending vanes, a clutch element on the driven shaft, co-operative clutch devices on the impeller adapted to establish direct drive from the driving shaft to the driven shaft when the impeller is in the direct drive position, means for sealing the impeller against travel of liquid therethrough when the impeller is in the direct drive position, a turbine member concentrically located with respect to the driving shaft and the impeller, said turbine member having a plurality of sets of outwardly extending vanes having the peripheral diameters of said sets of vanes progressively smaller from the neutral towards the direct drive position, a driving connection between the turbine and the driven shaft, a suitable casing enclosing all of said parts in liquid tight fashion, passages in individual communication with the discharge ends of the various sections of the turbine, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine sections to the inlet side of the impeller, substantially as described.

6. A fluid change speed device comprising in combination aligned driving and driven shafts, an impeller slidably and drivingly mounted on the driving shaft adapted to be shifted progressively from a neutral position through a forward running position to a direct drive position, said impeller having a series of outwardly extending vanes and passages, a clutch element on the driven shaft, co-operative clutch devices on the impeller adapted to establish direct drive from the driving shaft to the driven shaft when the impeller is in the direct drive position, means for sealing the impeller against travel of liquid therethrough when the impeller is in the direct drive position, a turbine member concentrically located with respect to the driving shaft and the impeller, said turbine member having a set of outwardly extending vanes into which the impeller is adapted to deliver liquid when in a position intermediate between the neutral and direct drive positions, a driving connection between the turbine and the driven shaft, a suitable casing enclosing all of said parts in liquid tight fashion, a passage in communication with the discharge ends of the turbine section, valve mechanism for controlling the communication of said passage with the inlet side of the impeller, means under the control of the operator for shifting the impeller longitudinally of the driving shaft into the different positions, and means for simultaneously actuating the valve mechanism to thereby permit communication between the turbine section and the inlet side of the impeller only when the impeller passages are in communication with the turbine, substantially as described.

7. A fluid change speed device comprising in combination aligned driving and driven shafts, an impeller slidably and drivingly mounted on the driving shaft and adapted to be shifted progressively from a reversing position through a neutral position to a forward running position, said impeller having a series of outwardly extending vanes, a turbine member concentrically located with respect to the driving shaft and the impeller, said turbine member having a plurality of sets of outwardly extending vanes corresponding to the reversing and forward running positions, a stationary guide vane ring overlying the reversing position of the impeller and having a series of outwardly extending vanes adapted to receive liquid discharged by the impeller and direct the same into a reversed rotary direction of flow, the outwardly extending vanes of the turbine which correspond to the reversing position of the impeller being adapted to cause reverse movement of the turbine as compared to the direction of rotation of the impeller, a driving connection between the turbine and the driven shaft, a suitable casing enclosing all of said parts in liquid tight fashion, passages in individual communication with the discharge ends of the various sections of the turbine, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine sections to the inlet side of the impeller, substantially as described.

8. A fluid change speed device comprising in combination aligned driving and driven shafts, an impeller slidably and drivingly mounted on the driving shaft and adapted to be shifted progressively from a reversing position through a neutral position to a forward running position, said impeller having a series of outwardly extending vanes, a turbine member concentrically located with respect to the driving shaft and the impeller, said turbine member having a plurality of sets of outwardly extending vanes corresponding to the reversing and forward running positions, a stationary guide vane ring between the impeller and the reversing turbine section the outwardly extending vanes of the turbine which correspond to the reversing position of the impeller being adapted to cause reverse movement of the turbine as compared to the direction of rotation of the impeller, a driving connection between the turbine and the driven shaft, a suitable casing enclosing all of said parts in liquid tight fashion, passages in individual communication with the discharge ends of the various sections of the turbine, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine sections to the inlet side of the impeller, substantially as described.

9. A fluid change speed device comprising in combination aligned driving and driven shafts, an impeller slidably and drivingly mounted on the driving shaft and adapted to occupy either a reversing position or a forward running position, said impeller having a series of outwardly extending vanes, a turbine member concentrically located with respect to the driving shaft and the impeller, said turbine member having a set of outwardly extending forward running vanes and another set of outwardly extending reversing vanes, a stationary guide vane ring between the impeller and the reversing turbine section the impeller being adapted to deliver liquid selectively into either the forward running or the reversing vanes of the turbine, a driving connection from the turbine to the driven shaft, a suitable casing enclosing all of said parts in liquid tight fashion, passages in individual communication with the discharge ends of the sections of the turbine, valve mechanism for controlling the communication of said passages with the inlet side of the impeller, means under the control of the operator for shifting the impeller longitudinally of the driving shaft into the different positions, and means for simultaneously shifting the position of the valve mechanism to thereby simultaneously control the communication from the turbine passages to the inlet side of the impeller, substantially as described.

10. A fluid change speed device comprising in combination aligned driving and driven shafts, an impeller slidably and drivingly mounted on the driving shaft and adapted to occupy either a reversing position or a forward running position, said impeller having a series of outwardly extending vanes, a turbine member concentrically located with respect to the driving shaft and the impeller, said turbine member having a set of outwardly extending forward running vanes and another set of outwardly extending reversing vanes, a stationary guide vane ring between the impeller and the reversing turbine section, the impeller being adapted to deliver liquid selectively into either the forward running or the reversing vanes of the turbine, a driving connection between the turbine and the driven shaft, a suitable casing enclosing all of said parts in liquid tight fashion, passages in individual communication with the discharge ends of the sections of the turbine, valve mechanism for controlling the communication of said passages with the inlet side of the impeller, means for shifting the impeller longitudinally of the driving shaft into the different positions, and means for shifting the position of the valve mechanism, substantially as described.

11. A fluid transmission device comprising in combination aligned driving and driven shafts, an impeller slidably and drivingly mounted on the driving shaft and adapted to occupy different driving positions thereon, said impeller having a series of outwardly extending vanes, a turbine member concentrically located with respect to the driving shaft and the impeller, said turbine member having a set of outwardly extending vanes corresponding to each driving position of the impeller, a driving connection between the turbine and the driven shaft, a suitable casing enclosing all of said parts in liquid tight fashion, passages in individual communication with the discharge ends of the sections of the turbine, valve mechanism for controlling the communication of said passages with the inlet side of the impeller, means for shifting the impeller longitudinally of the driving shaft into different positions and means for correspondingly shifting the position of the valve mechanism, substantially as described.

12. A fluid transmission device comprising in combination aligned driving and driven shafts, an impeller slidably and drivingly mounted on the driving shaft and adapted to occupy different driving positions thereon, said impeller having a series of outwardly extending vanes, a turbine member concentrically located with respect to the driving shaft and the impeller, said turbine member having a set of outwardly extending vanes corresponding to each driving position of the impeller, and said sets of turbine vanes being of different peripheral diameters, a driving connection between the turbine and the driven shaft, a suitable casing enclosing all of said parts in liquid tight fashion, suitable passages in said casing for the circulation of liquid from the outer peripheries of the turbine vanes of each set independently of the other turbine vanes, means for shifting the impeller longitudinally of the high speed shaft into different positions and means for correspondingly controlling the flow of liquid through the passages in communication with the turbine sections, substantially as described.

13. A fluid transmission device comprising in combination aligned driving and driven shafts, an impeller slidably and drivingly mounted on the driving shaft and adapted to occupy different positions thereon, said impeller having a series of outwardly extending vanes, a turbine concentrically located with respect to the driving shaft and the impeller, said turbine member having a set of outwardly extending vanes corresponding to each position of the impeller, a driving connection between the turbine and the driven shaft, a suitable casing enclosing all of said parts in liquid tight fashion, and means for controlling the return flow of liquid from the different sections of the turbine to the inlet side of the impeller, substantially as described.

14. A fluid transmission device comprising in combination an impeller having a series of outwardly extending vanes, a turbine concentrically located with respect to the impeller, and having a plurality of sets of outwardly extending vanes of different peripheral diameters, said turbine having a central bore of size to receive the impeller in liquid tight fashion, means for shifting the impeller axially with respect to the turbine to thereby establish communication between the impeller and a selected turbine section, means in conjunction with the turbine permitting a return flow of liquid from each of the sections of the turbine to the inlet side of the impeller, and means for controlling the return flow of liquid selectively according to the relative positions of the impeller and the turbine, substantially as described.

15. A fluid transmission device comprising in combination an impeller having a series of outwardly extending vanes, a turbine member concentrically located with respect to the impeller, and having a plurality of sets of outwardly extending vanes of different peripheral diameters, said turbine having a central bore of size to receive the impeller in liquid tight fashion, means for shifting the impeller axially with respect to the turbine to thereby establish communication between the impeller and a selected turbine section, and means in conjunction with the turbine and the impeller permitting a return flow of liquid to the inlet side of the impeller only from that turbine section into which liquid is being momentarily delivered by the impeller, substantially as described.

16. A fluid transmission device comprising in combination an impeller having a series of outwardly extending vanes, a turbine concentrically located with respect to the impeller and having sets of outwardly extending vanes adapted to cause rotation of the turbine in opposite directions, a stationary guide vane ring between the impeller and the turbine said turbine having a central bore of size to receive the impeller in liquid tight fashion, means for shifting the impeller axially with respect to the turbine to thereby establish communication between the impeller and a selected turbine section, means in conjunction with all of said parts permitting a return flow of liquid from the turbine sections to the inlet side of the impeller, and means for controlling said return flow of liquid selectively according to the relative positions of the turbine and the impeller, substantially as described.

17. A fluid transmission device comprising in combination a centrifugal pump having a series of peripheral liquid discharge openings and a central inlet opening, a concentrically located turbine having an inlet opening adapted to at times directly receive liquid discharged from the pump openings and having a peripheral discharge opening, means for shifting the pump axially with respect to the turbine to bring the discharge openings of the pump and the inlet opening of the turbine either into direct registry or out of said registry, means for sealing the discharge openings of the pump when not so registered, passages permitting return flow of liquid from the turbine to the pump, and means for discontinuing the continuity of said passages when the discharge passages of the pump are not in communication with the inlet opening of the turbine, substantially as described.

18. A fluid transmission device comprising in combination a centrifugal pump having a series of peripheral liquid discharge openings and a central inlet opening, a series of concentrically located turbines of different characteristics each having an inlet opening adapted to at times directly receive liquid discharged from the pump openings and having a peripheral discharge opening, means for shifting the pump axially with respect to said series of turbines to thereby bring the discharge openings of the pump into direct registry with the inlet opening of a selected turbine, passages from the turbines to the inlet side of the pump including sections in individual communication with the different turbines, and means for selectively establishing continuity and discontinuity of said passages to the pump according to the position of the pump with respect to the turbines, substantially as described.

19. A fluid transmission device comprising in combination a centrifugal pump, a series of turbines of different characteristics in driving connection with a common element, said turbines being adapted for normal operation in opposite directions, means for placing the pressure side of the pump in direct association with the inlet side of a selected turbine, and means for simultaneously permitting return of liquid from the discharge side of said turbine to the suction side of the pump, and for preventing communication of the discharge side of the other turbines with the suction side of the pump and a common, substantially oil tight housing for all of said elements, substantially as described.

20. A fluid transmission device comprising in combination a series of turbines, means for compelling all of said turbines to operate at the same angular velocity at each instant, said turbines being adapted for normal operation at different angular speeds when subjected to the same inlet fluid pressure, clutch means normally establishing driving connection from the turbines to a driven element, rotary means for placing fluid under pressure, means for placing said rotary means in direct connection with the inlet side of a selected turbine, and means for establishing a direct driving connection from the rotary means to the driven element and for simultaneously disengaging the driven element from the turbines, substantially as described.

21. A fluid transmission device comprising in combination a series of turbines, means for compelling all of said turbines to operate at the same angular velocity at each instant, one of said turbines being adapted for normal operation in one direction of rotation and another turbine being adapted for normal operation in the other direction of rotation, clutch means normally establishing driving connection from the turbines to a driven element, rotary means for placing fluid under pressure, means for placing said rotary means in direct connection with the inlet side of a selected turbine, and means for establishing a direct driving connection from the rotary means to the driven element and for simultaneously disengaging the driven element from the turbines, substantially as described.

22. A fluid transmission device comprising in combination a turbine, clutch means normally establishing driving connection from said turbine to a driven element, rotary means for placing fluid under pressure, means for placing said rotary means in connection with the inlet side of the turbine, and means for establishing direct drive connection from the rotary means to the driven element and for simultaneously disengaging the driven element from the turbine, substantially as described.

23. The combination with an internal combustion engine and a driven shaft adapted for normal operation in the same direction of rotation as the engine shaft, of a fluid transmission device interposed between the engine and said shaft and including a series of turbines rigidly connected together and operating as a unit, the turbine nearest to the engine being adapted for normal operation in direction of rotation contrary to that of the engine, and the other turbines being adapted for normal operation in the same direction of rotation as the engine and at progressively increasing angular speeds from the engine end towards the driven shaft when subjected to the same inlet fluid pressure, a centrifugal pump directly driven by the engine shaft for placing fluid under pressure, means for delivering said fluid under pressure directly to the inlet side of a selected turbine, means for sealing the passages of the pump against flow of liquid through them when the pump occupies a position intermediate between the reversing turbine and the first one of the series of forward turbines, means normally establishing a driving connection from the turbines as a group to the driven shaft, and means for establishing a direct driving connection between the engine shaft and the driven shaft and for simultaneously disengaging said turbine connection, substantially as described.

24. The combination with an internal combustion engine and a driven shaft adapted for normal operation in the same direction of rotation as the engine shaft, of a fluid transmission device interposed between the engine and said shaft and including a series of turbines rigidly connected together and operating as a unit, the turbine nearest to the engine being adapted for normal operation in direction of rotation contrary to that of the engine, and the other turbines being adapted for normal operation in the same direction of rotation as the engine and at progressively increasing angular speeds from the engine end towards the driven shaft when subjected to the same inlet fluid pressure, a centrifugal pump directly driven by the engine shaft for placing fluid under pressure, means for moving said pump to deliver such fluid under pressure directly to the inlet side of a selected turbine, means normally establishing a driving connection from the turbines as a group to the driven shaft, and means for establishing a direct driving connection between the engine shaft and the driven shaft and for simultaneously disengaging the said turbine connection, substantially as described.

25. The combination with an internal combustion engine and a driven shaft adapted for normal operation in the same direction of rotation as the engine shaft, of a fluid transmission device interposed between the engine and said shaft and including a series of turbines rigidly connected together and operating as a unit, said turbines being adapted for normal operation in the same direction of rotation as the engine and at progressively increasing angular speeds from the engine end towards the driven shaft when subjected to the same inlet fluid pressure, a centrifugal pump directly driven by the engine shaft for placing fluid under pressure, means for moving said pump to deliver said liquid under pressure directly to the inlet side of a selected turbine, means for sealing the passages of the pump against flow of liquid through them when the pump occupies a position nearer to the engine than the first one of the series of turbines, means normally establishing a driving connection from the turbines as a group to the driven shaft, and means for establishing a direct driving connection between the engine shaft and the driven shaft and for simultaneously disengaging the turbine connection, substantially as described.

26. The combination with an internal combustion engine and the driven shaft adapted for normal operation in the same direction of rotation as the engine shaft, of a fluid transmission device interposed between the engine and said shaft and including a turbine, adapted for normal operation in the same direction of rotation as that of the engine, a centrifugal pump directly driven by the engine shaft for placing fluid under pressure, means for positioning the pump to deliver said fluid under pressure directly to the inlet side of the turbine, means for sealing the passages of the pump against flow of liquid through them when the pump occupies a position nearer to the engine than the turbine, means normally establishing a driving connection from the turbine to the driven shaft and means for establishing a direct driving connection between the engine shaft and the driven shaft, and for simultaneously disengaging said turbine connection, substantially as described.

27. The combination with an internal combustion engine and a driven shaft adapted for normal operation in the same direction of rotation as the engine shaft, of a fluid transmission device interposed between the engine and said shaft and including a turbine adapted for normal operation in the same direction of rotation as the engine, a centrifugal pump directly driven by the engine shaft for placing fluid under pressure, means for positioning the pump to deliver said fluid under pressure directly to the inlet side of the turbine, means normally establishing a driving connection from the turbine to the driven shaft, and means for establishing a direct driving connection between the engine shaft and the driven shaft and for simultaneously disengaging said turbine connection, substantially as described.

28. A fluid transmission device comprising in combination a centrifugal pump having a series of peripheral liquid discharge openings and a central inlet opening, a series of concentrically located turbines of different characteristics each having an inlet opening adapted to at times directly receive liquid discharged from the pump openings and having a peripheral discharge opening, means for shifting the pump axially with respect to said series of turbines to thereby bring the discharge openings of the pump into direct registry with the inlet openings of a selected turbine, passages from the turbines to the inlet side of the pump including sections in individual communication with the different turbines, all of said passages terminating within a plane lying at right angles to the axis of rotation of the pump, a radial valve member rotatably mounted for operation within said plane and having suitable ports for selectively establishing continuity and discontinuity of said passages to the pump, and means for selectively moving said valve in said plane according to the position of the pump with respect to the turbines, substantially as described.

29. A fluid transmission device comprising in combination a centrifugal pump having a series of peripheral liquid discharge openings and a central inlet opening, a series of concentrically located turbines of different characteristics each having an inlet opening adapted to at times directly receive liquid discharged from the pump openings and having a peripheral discharge opening, means for shifting the pump axially with respect to said series of turbines to thereby bring the discharge openings of the pump into direct registry with the inlet openings of a selected turbine, passages from the turbines to the inlet side of the pump including sections in individual communication with the different turbines, all of said passages terminating within a common plane, a flat valve member mounted for operation within said plane and having suitable ports for selectively establishing continuity and discontinuity of said passages to the pump, and means for selectively moving said valve in said plane according to the position of the pump with respect to the turbines, substantially as described.

30. A fluid transmission device comprising in combination rotary pumping means, a series of concentrically located turbines of different characteristics each having an inlet opening adapted to at times directly receive liquid discharged from the pumping means and having a peripheral discharge opening, means for bringing the pumping means into direct registry with the inlet openings of a selected turbine, passages from the turbines to the inlet side of the pumping means including sections in individual communication with the different turbines, all of said passages terminating within a common plane, a flat valve member mounted for operation within said plane and having suitable ports for selectively establishing continuity and discontinuity of said passages to said pumping means, and means for selectively moving said valve in said plane, substantially as described.

31. A fluid transmission device comprising in combination rotary pumping means, a series of concentrically located turbines of different characteristics each having an inlet opening adapted to at times directly receive liquid discharged from the pumping means and having a peripheral discharge opening, means for bringing the pumping means into direct registry with the inlet openings of a selected turbine, passages from the turbines to the inlet side of the pumping means including sections in individual communication with the different turbines, all of said passages terminating within a common surface, a valve member movably mounted for operation within said surface and having suitable ports for selectively establishing continuity and discontinuity of said passages to the pumping means, and means for selectively moving said valve in said surface, substantially as described.

THOMAS A. BANNING, Jr.